United States Patent [19]

La Fiandra

[11] Patent Number: 5,745,278
[45] Date of Patent: Apr. 28, 1998

[54] INNOVATIVE DEFORMABLE MIRROR ACTUATOR CONFIGURATION

[75] Inventor: Carlo La Fiandra, New Canaan, Conn.

[73] Assignee: Raytheon Optical Systems, Inc., Danbury, Conn.

[21] Appl. No.: 796,008

[22] Filed: Feb. 5, 1997

[51] Int. Cl.$^6$ .................................................. G02B 26/08
[52] U.S. Cl. ........................... 359/224; 359/223; 359/295; 310/328; 310/366
[58] Field of Search ................................. 359/223, 224, 359/290, 291, 295; 310/328, 365, 366

[56] References Cited

U.S. PATENT DOCUMENTS 5,579,179  11/1996  Ji et al. ..................................... 359/224
5,629,578  5/1997  Winzer et al. ........................... 310/334

Primary Examiner—James Phan
Attorney, Agent, or Firm—W. C. Schubert; G. H. Lenzen, Jr.

[57] ABSTRACT

An assembly comprises a base (12,12') and a thin optical substrate (44) having a light reflective first surface (43) and an opposite back surface (45). A coupling medium (8,8) couples the back surface (45) of said optical substrate and the base to one another. At least one piezoelectric actuator (10) is interspersed within the coupling medium for controllably altering the shape of the optical substrate.

7 Claims, 3 Drawing Sheets

INNOVATIVE DEFORMABLE MIRROR ACTUATOR CONFIGURATION

BACKGROUND OF THE INVENTION

The present invention relates to a deformable mirror primarily intended for use as a beam train optic where frequency response, reliability, and cost of manufacture are critical to the design, performance and usefulness.

A deformable mirror which is used as a downstream optic in conjunction with a substantially larger optical system which is disposed upstream thereof must possess a high degree of sensitivity with respect to its ability to make highly minute adjustments to the reflective surface of the mirror. This is because such optical downstream mirrors represent the upstream optics in miniature. Such mirrors have a diameter in the range of five to fifteen inches, but for the larger sizes use on the order of about one thousand separate piezoelectric actuators to effect such adjustments. As can be expected, the nearly one thousand piezoelectric actuators which are used, are highly miniaturized and make assembly of the approximately one thousand piezoelectric actuators with the deformable mirror painstakingly tedious.

The present invention thus has the specific advantages of the elimination of such mechanical figure control actuators, force or displacement types, which require individual fabrication, assembling and wiring into the final deformable mirror assembly one at a time. Instead, the arrays of actuators of the present invention are constructed in a one piece linear array configuration and manufactured in one piece thereby significantly reducing and/or eliminating the traditional hand labor costs required of other mechanical actuator based systems. The arrays are then stacked side-by-side to form the total number of actuators required for a specific deformable mirror configuration.

Accordingly, it is an object of the present invention to provide a continually supported deformable mirror support using uniblock construction, mass produced, piezoelectric actuators as an alternative to individual piezoelectric actuators thereby eliminating manufacturing and assembly costs inherent in systems utilizing such actuators.

Still a further object of the invention is to provide a continually supported thin mirror which is lighter in weight and less expensive to manufacture than those mirrors heretofore known.

Yet a further object of the invention is to provide a more reliable electrical connection to the actuators.

SUMMARY OF THE INVENTION

The invention resides in a monolithic actuation support system, and more particularly in a monolithic array actuation support assembly and comprises a base and a thin optical substrate having a light reflecting first surface and an opposite back surface. A coupling medium couples the rear surface of the optical substrate and the base to one another. At least one piezoelectric actuator is interspersed within the coupling medium for controllably altering the shape of the optical substrate.

DETAILED DESCRIPTION OF THE PREFERRED EMBODIMENT

Figure 1:
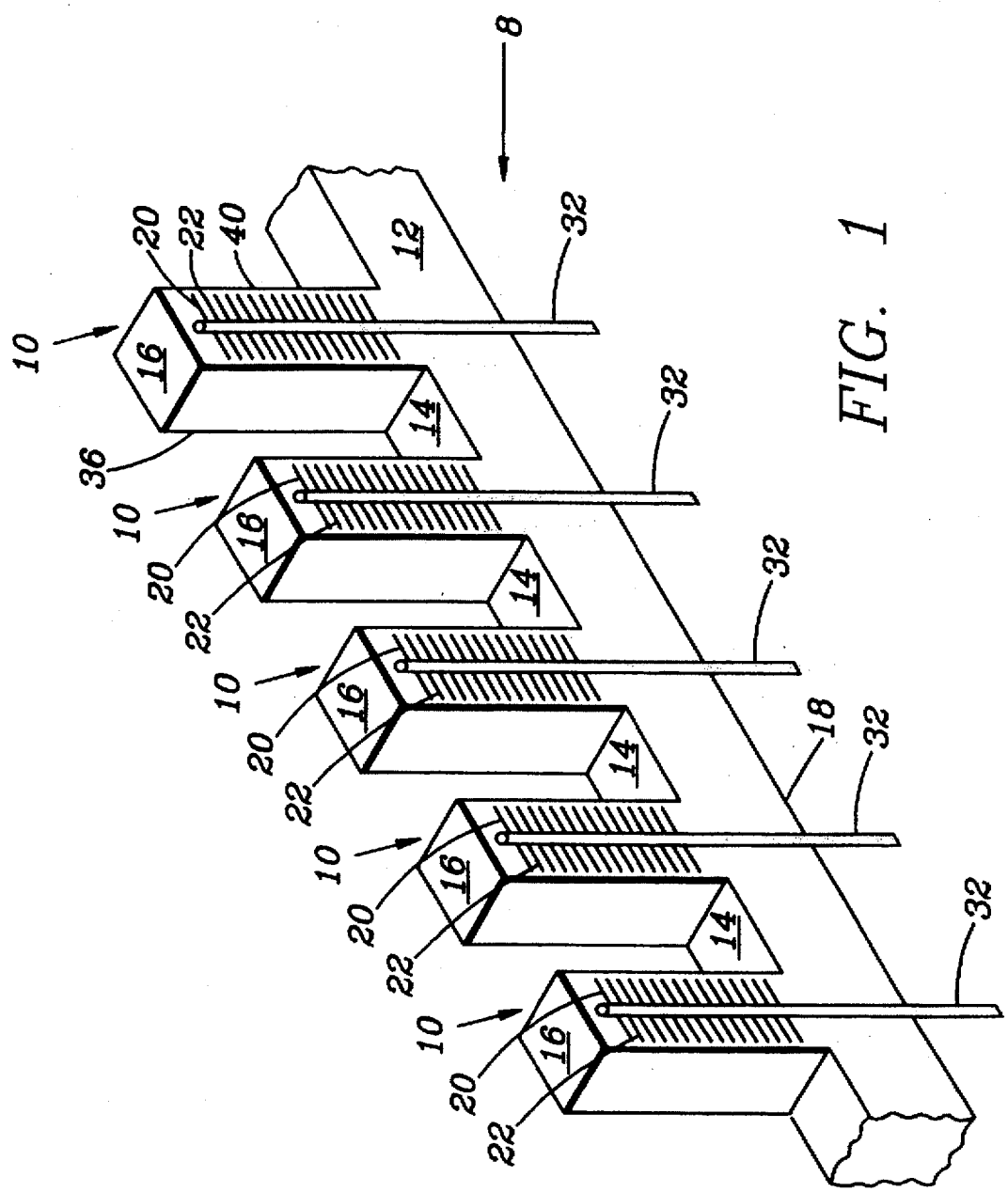
FIG. 1 shows an isometric view of an array of piezoelectric actuators fabricated with the conventional tape cast multi-layer construction.

FIG. 1 depicts an isometric view of the invention which is an array 8 of piezoelectric actuators 10,10 fabricated with a conventional tape cast multi-layer construction. The actuators 10 are each integrally connected by a common base 12 to create a "pocket comb" like configuration. Each array length or block is made from a one piece block which is subsequently saw cut to crate the spaces 14,14 between each actuator 10. This "uniblock" construction array of actuators can be made to any length required since the continuous tape casting process will accommodate it. Each actuator 10 has a top support surface 16 which is coplanar with the other such surfaces and extends substantially parallel with the lower surface 18 of the base 12.

Figure 3:
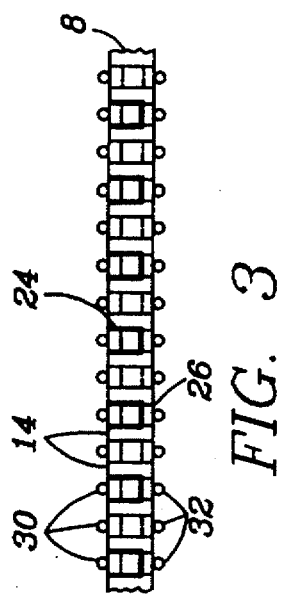
FIG. 3 is a top view of the piezoelectric actuators shown in FIG. 1.
Figure 2:
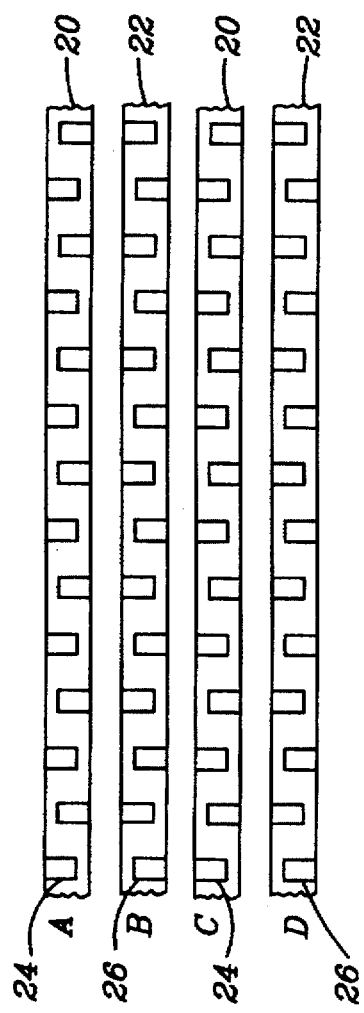
FIG. 2 is a horizontal sectional view through a uniblock prior to cutting slots between the multilayer construction of the piezoelectric actuators shown in FIG. 1.
Figure 4:
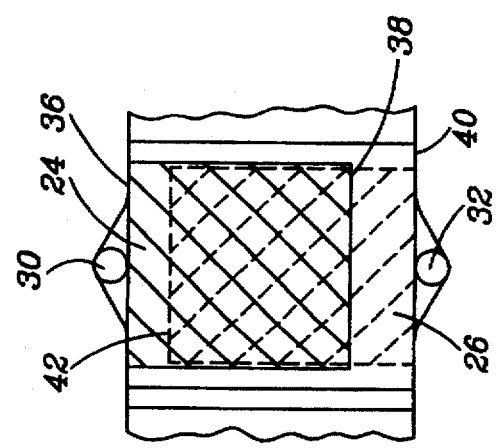
FIG. 4 is a top detailed view of an individual actuator.

As shown in FIGS. 2, 3 and 4, each actuator 10,10 has a configuration of multilayers 20 and 22 which are comprised of oppositely charged electrodes 24 and 26 which are printed onto stacked layers of piezoelectric ceramic in a vertically interdigitated manner as illustrated. The consecutively ordered layers A, B, C, and D are oriented such that they are stacked on one another, in an alternating fashion such that electrodes, of like polarity, e.g. A,C and B,D have an electrode layer of opposite polarity interposed therebetween such that all of the electrodes are in the proper spatial relationship. The electrodes 24 and 26 are silk screened in a conventional manner onto the piezoelectric ceramic substrate and are aligned with each other using fiducial references. Also, it is noted that controlled width grinding of the array exposes the end parts of the electrodes along either side. As will become apparent, it is desirable to make the electrodes as long as possible without shorting out on the opposite side.

As best seen in FIGS. 3 and 4, the silk screened electrode pattern on alternate layers is exposed to one side of each actuator and a conductor wire 30, 32 is run the full length thereof making electrical contact with the associated alternate layers. Each wire conductor 30, 32 is subsequently connected to the actuator drive electronics for electrical actuation purposes. As illustrated in FIG. 4, the alternate printed electrode layer 24 shown with top right to bottom left cross hatching extends from side 36 where it electrically connects to conductor wire 30 and extends inwardly therefrom to end line 38, while electrode layer 26 shown with bottom right to top left cross hatching extends from side 40 where it electrically connects to conductor wire 32 and extends inwardly therefrom to end line 42. Thus, each silk screened electrode 24 and 26 only makes contact with one conductor wire on one side because each is not printed across the full width of the actuator.

Figure 5A:
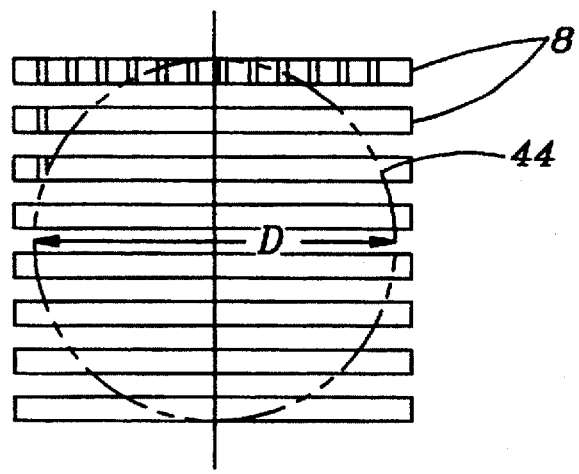
FIG. 5a is a top schematic view depicting the arrangement of actuator arrays as assembled to a deformable mirror shown in phantom line.
Figure 5B:
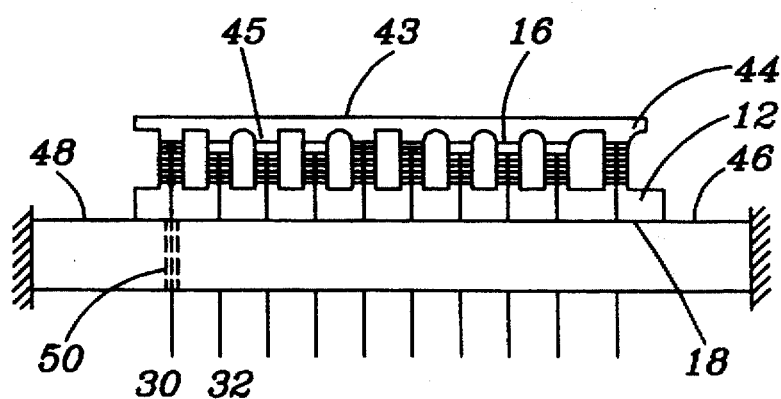
FIG. 5b is a side elevation view depicting the arrangement of an actuator array as assembled to a deformable mirror.

FIGS. 5a and 5b depict the actuator arrays as used in assembly with a deformable mirror or face plate 44 having a reflective surface 43 and an opposite surface 45. Typically, a plurality of array blocks 8,8 such as shown in FIG. 1 are set up parallel to each other. Each array block 8 has a length sufficient to match the diameter D of the mirror 44. A base plate 46 having a flat support surface 48 is provided and each array block 8,8 is bonded to the common base at the surface 48. Both the bottom surface 18 of the actuator array and top surface 48 of the base are configured flat to ensure proper contact. Likewise, the top surface 16 of each of the actuators 8,8 is made planar to ensure proper mating with the back surface 45 of the face plate 44 of the assembly. The electrical wires 30,32 may be run through holes 50 formed in the base plate as shown, or could be run along the top surface 48 of the base plate 46 to the control electronics.

Figure 6:
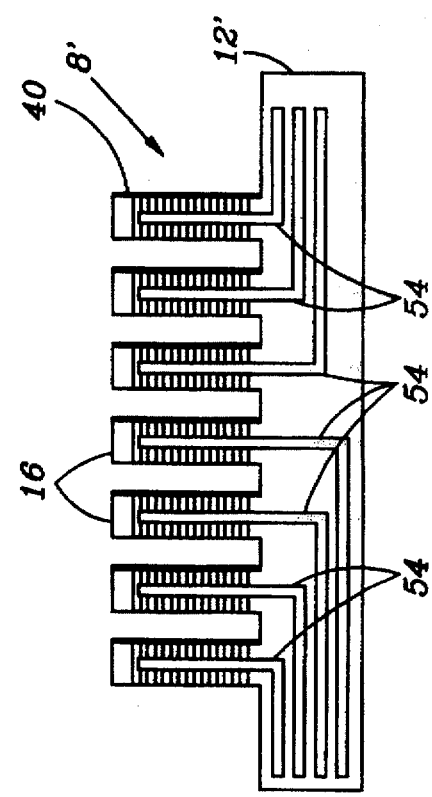
FIG. 6 depicts an alternate embodiment of the invention wherein conducting leads are silk screened to the array.

Referring now to FIG. 6, an alternate embodiment of a more mass production oriented configuration of the array 8' is shown. In this embodiment the wire conductors 30,32 are replaced by leads 54 which are silk screened to the sides 36, 40 of each actuator to accomplish the electrical connections. Using this technique, all of the leads can be laid down in one process step. Electrical connection can then be made at the end of each actuator array block. Also, as shown, the base 12' may be of a depth sufficient to also serve as the base plate 46.

In use, the control electronics cause selective ones of the leads 30, 32 or 54' to be energized by a voltage source thereby causing an elongation of the involved actuator 10. Since each array is fabricated in a conventional tape cast multi-layer construction using a piezoelectric material, each actuator in each array layer is changeable in length with voltage such that upon energization of selective one(s) of the actuators 10,10 a local bump or depression is created at the back surface 45 of the mirror 44. Bias voltages of all actuators are sometimes used such that motion of the mirror surface can be in either direction, i.e., plus or minus.

Accordingly, the invention has been described by way of illustration and not limitation.

What is claimed is:

1. An assembly comprising:

a base;

a thin optical substrate having a light reflective first surface and an opposite back surface;

coupling means for controllably movably coupling said back surface of said optical substrate and said base to one another; and said coupling means including a plurality of piezoelectric actuators, each actuator including opposite vertically extending sides and a configuration of multilayers comprised of oppositely charged electrodes which are printed onto stacked layers of ceramic in a vertically interdigitated manner, the stacked electrodes extending to one of said vertically extending sides depending on the designated polarity, the plurality of actuators being integrally connected to the base such that an array length of said actuators creates a pocketcomb-like configuration.

2. An assembly as defined in claim 1 further characterized in that said plurality of piezoelectric actuators each has a top flat surface which is disposed coplanar with the ends of other piezoelectric actuators for coupling to said back surface.

3. An assembly as defined in claim 2 further characterized in that each array length is made from a one piece block which is subsequently saw cut to create the spaces between each actuator.

4. An assembly as defined in claim 1 further characterized in that said electrodes on alternate layers are commonly connected on one of said sides of each actuator and a conductor wire is disposed along said one sides of said actuators and runs the full length thereof making electrical contact with said alternate electrode layers.

5. An assembly as defined in claim 4 further characterized in that each said electrode is printed partially across the full width of the actuator.

6. An assembly as defined in claim 5 further characterized in that said assembly includes a plurality of actuator array lengths with each array length having a length sufficient to match the diameter of the optical substrate and each of said actuator array lengths at said base thereof being connected to a base plate having a flat support surface.

7. An assembly as defined in claim 1 further characterized in that electrical leads are printed onto the sides of each actuator to accomplish the electrical connections to the electrodes.

* * * * *